(12) United States Patent
Goodill et al.

(10) Patent No.: US 8,554,949 B2
(45) Date of Patent: Oct. 8, 2013

(54) CUSTOMER TRAFFIC FORWARDING CONTINUES WHILE CONTROL PLANE IS RESET

(75) Inventors: Eric Goodill, Menlo Park, CA (US); Manuel Jude Fernandes, Vancouver (CA); Tak Kuen Tang, Vancouver (CA); Lei Glen Chen, Sunnyvale, CA (US)

(73) Assignee: Ericsson AB, Stockholm (SE)

( * ) Notice: Subject to any disclaimer, the term of this patent is extended or adjusted under 35 U.S.C. 154(b) by 1487 days.

(21) Appl. No.: 11/725,084

(22) Filed: Mar. 16, 2007

(65) Prior Publication Data

US 2007/0220358 A1    Sep. 20, 2007

Related U.S. Application Data

(60) Provisional application No. 60/783,751, filed on Mar. 17, 2006.

(51) Int. Cl.
  *G06F 15/173* (2006.01)
(52) U.S. Cl.
  USPC ............................. 709/243; 370/216; 714/4.1
(58) Field of Classification Search
  USPC ............................. 709/243; 370/216; 714/4.1
  See application file for complete search history.

(56) References Cited

U.S. PATENT DOCUMENTS

| | | | |
|---|---|---|---|
| 6,601,186 B1 * | 7/2003 | Fox et al. ..................... | 714/4.12 |
| 6,785,843 B1 | 8/2004 | McRae et al. | |
| 2004/0255202 A1 * | 12/2004 | Wong et al. ..................... | 714/43 |
| 2006/0018253 A1 * | 1/2006 | Windisch et al. ............ | 370/216 |

OTHER PUBLICATIONS

PCT International Search Report and Written Opinion Appln No. PCT/US07/06895, mailed Apr. 28, 2008. (4 pages).
International Preliminary Report on Patentability, Application No. PCT/US2007/006895, dated Sep. 23, 2008.
Suppernentary European Search Reports, EP 07 75 3517, Nov. 5, 2009, 2 pages.
*Communication pursuant to Article 94(3) EPC*, EP Application No. 07753517.7, dated May 10, 2012, 5 pages.
*Third Office Action*, Chinese Application No. 200780013721.4, dated Aug. 3, 2012, 10 pages.

* cited by examiner

*Primary Examiner* — Alina N Boutah
*Assistant Examiner* — Adam Cooney
(74) *Attorney, Agent, or Firm* — Blakely Sokoloff Taylor & Zafman, LLP (57) ABSTRACT

A method and apparatus selectively resetting a control plane in a network element is described. One embodiment of the invention is a network element with a selective reset controller that can reset the control plane of the network element without interrupting the data traffic processing of the data plane of the network element.

23 Claims, 7 Drawing Sheets

CUSTOMER TRAFFIC FORWARDING CONTINUES WHILE CONTROL PLANE IS RESET

CROSS-REFERENCE TO RELATED APPLICATIONS

This application claims the benefit of U.S. provisional patent application No. 60/783,751, entitled "Customer Traffic Forwarding Continues While Control Plane is Reset", filed Mar. 17, 2006.

BACKGROUND

1. Field

Embodiments of the invention relate to the field of computer networking; and more specifically, to forwarding data traffic when the control plane is reset.

2. Background

Highly-available network switches are used to enable mission critical services to customers because these switches are designed to withstand faults or crashes in components of the network switch. A typical highly-available network switch comprises multiple line cards for data traffic processing and multiple control cards to control the overall running of the network switch. Although the network switch typically needs one control card for the operation of the network switch, a second redundant card is usually employed as a hot-standby. In this scenario, if the control card fails, crashes or otherwise resets, the controlling operation of the network switch fails over to the second standby card. The standby card maintains a state of the initial control card, thus allowing the failover of the control to happen quickly with minimal or no loss of data traffic processing. However, if both control cards fail, or there is one only control card and that fails, the network switch typically resets the entire switch resulting in a significant interruption of data traffic processing.

BRIEF SUMMARY

A method and apparatus selectively resetting a control plane in a network element is described. One embodiment of the invention is a network element with a selective reset controller that can reset the control plane of the network element without interrupting the data traffic processing of the data plane of the network element.

BRIEF DESCRIPTION OF THE DRAWINGS

Embodiments of the invention may be best understood by referring to the following description and accompanying drawings which illustrate such embodiments. The numbering scheme for the Figures included herein is such that the leading number for a given element in a Figure is associated with the number of the Figure. For example, network element 100 can be located in FIG. 1. However, element numbers are the same for those elements that are the same across different Figures. In the drawings.

DETAILED DESCRIPTION

In the following description, numerous specific details such as packet, motherboard, control plane, data plane, reset controller, packet processors, central processing units, line card, and interrelationships of system components are set forth in order to provide a more thorough understanding of the invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Exemplary embodiments of the invention will now be described with reference to FIGS. 1-6. In particular, the flow diagrams in FIG. 7 will be described with reference to the exemplary embodiments of FIGS. 1-5. However, it should be understood that the operations of these flow diagrams can be performed by embodiments of the invention other than those discussed with reference to FIGS. 1-5, and that the embodiments discussed with reference to FIGS. 1-5 can perform operations different than those discussed with reference to these flow diagrams.

A network device that forwards customer traffic while the control plane is reset has been described below. According to one embodiment of the invention, the network device comprises a control plane that controls the processing of the data traffic transmitted and received by the network device and a data plane that processes such data traffic. The network device is configured to reset both the control and data planes or reset the control plane in response to receiving different types of reset conditions.

Figure 1:
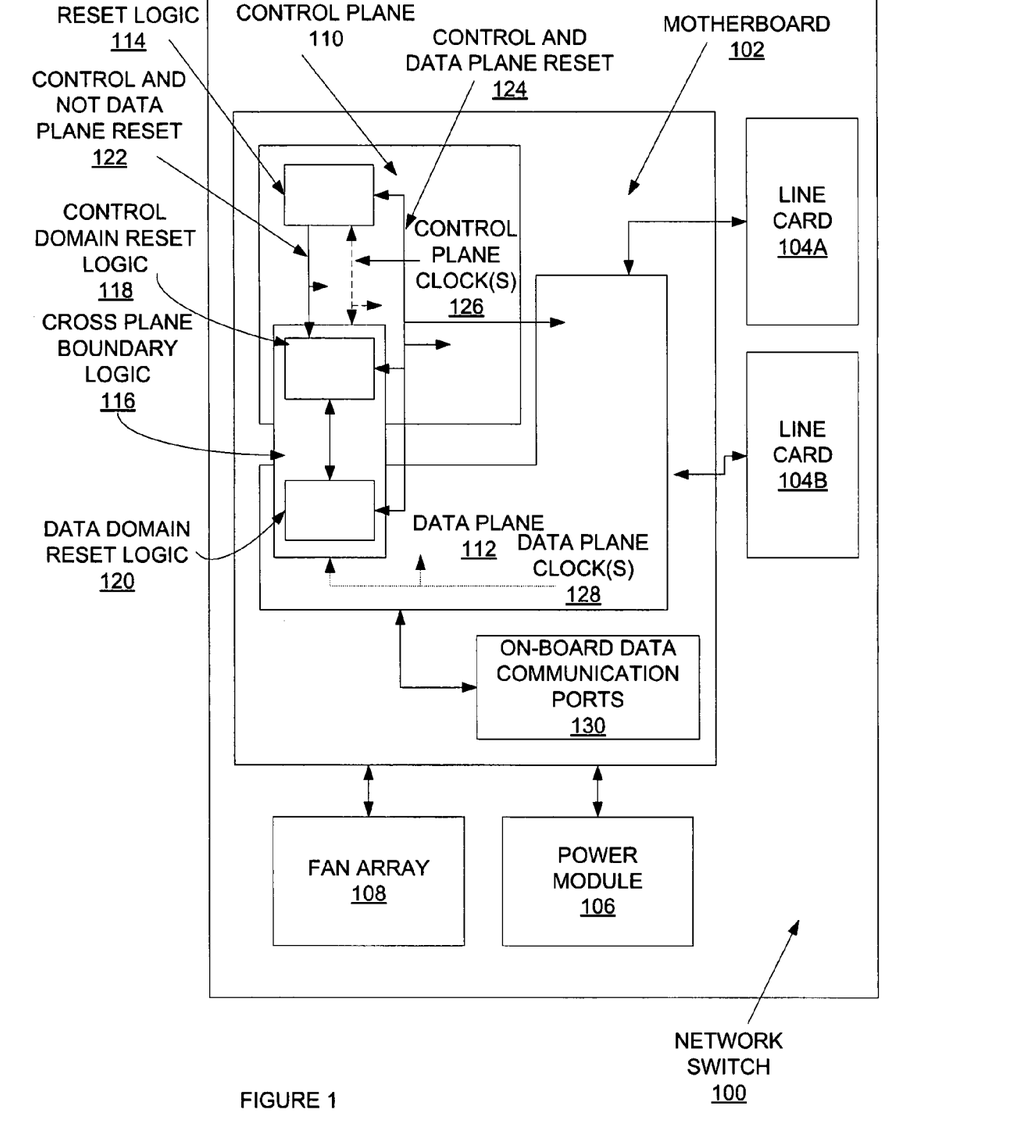
FIG. 1 illustrates a network element that continues forwarding data traffic when the control plane is reset according to one embodiment of the invention.

FIG. 1 illustrates a network element 100 that continues forwarding data traffic when the control plane is reset according to one embodiment of the invention. Network element 100 comprises motherboard 102, line cards 104A-B, power module 106, and fan array 108. Line cards 104A-B transmit and receive data traffic to and from devices coupled to the network element. While in the one embodiment, network element 100 has two line cards, in alternate embodiments, network element may have more or less line cards. Line cards 104A-B comprise physical interfaces for coupling with other devices such as, but not limited to, 10/100 Ethernet (copper or fiber connections), Gigabit Ethernet (copper or fiber connections), wireless, Optical Carrier (OC)/Synchronous Transport Module interfaces (STM) (OC-3/STM-1, OC-12/STM-4, etc.), Synchronous Optical Network (SONET), T1, Asynchronous Transfer Mode (ATM), etc. Furthermore, line cards 104A-B may comprise plug-in modules for the physical interfaces. Power module 106 comprises power supply to power network element 100. Fan array 108 comprises a fan assembly used to cool network element 100.

Motherboard 102 is the main board for controlling and processing the flow of data traffic in network element 100. Motherboard 102 comprises control plane 110, data plane 112, and on-board data communication ports 130. In one embodiment, unlike multi-card network elements above, network element 100 has one control plane and the control and data planes are merged onto the motherboard.

Similar to line cards 104A-B, on-board data communication ports 130 transmit and receive data traffic to and from devices coupled to the network element. On-board data communication ports 130 comprise physical interfaces for coupling with other devices such as, but not limited to, 10/100 Ethernet (copper or fiber connections), Gigabit Ethernet (copper or fiber connections), wireless, OC/STM interfaces, SONET, T1, Asynchronous Transfer Mode (ATM), etc.

Control plane 110 controls the processing of the data traffic transmitted and received in network element 100. For example and by way of illustration, control plane 110 manages configuration of data plane 112, keeps status of network element 100 collects statistics, interfaces with operator interfaces (command line interface, simple network management protocol, etc), processes alarms, etc. If control plane 110 is not running, data plane 112 may not be able to function properly and potentially not be able to process incoming and/or outgoing data traffic. Control plane 110 comprises reset logic 114 and control plane clock(s) 126. Control plane clock(s) 126 comprise one or more clocks that are used for clocking control plane 110. Furthermore, control plane 110 is coupled to cross plane boundary logic 116.

The function of data plane 112 is to process data traffic received and transmitted by network element 100. Data plane 112 processes the data according the configurations supplied by control plane 110. Furthermore, data plane 112 communicates with control plane 110 by, in part, communicating statistics, status, alarms, etc. Data plane 112 comprises data plane clock(s) 128 and is coupled to cross plane boundary logic 116. While in one embodiment, data plane clock(s) 128 is one or more clocks and is different from control plane clock(s) 126, in alternate embodiments, data plane clock(s) 128 can be the same as control plane clock(s) 126.

Periodically, control plane 110 and/or data plane 112 need to be reset. A reset brings the chip and/or device to a known state. A reset is triggered by many different situations, such as, but not limited to, power on, hardware reset button activated, software watchdog timer activated, operating system upgrade, software crash, etc. Control and not data plane reset 122 occur when the control plane is affected, where it is possible for the data plane to continue processing data traffic. Examples of control and not data plane resets 122 are, but not limited to, watchdog timer activation, operating system upgrade, control plane software upgrade, etc. Control and data plane reset 124 occur when both the control 110 and data 112 planes require a reset. Examples of control and data plane resets are power on, hardware reset button activated, etc. In a multi-card network element, resets are typically handled on a per card basis (reset the control card, live card, and/or both).

A reset of the control plane in a multi-card network element typically triggers a fast failover scheme to a redundant control card such that data traffic processing by live card are not interrupted. However, because network element 100 has one control plane, network element 100 cannot use a failover scheme due to a control plane reset. Furthermore, because control plane 110 and data plane 112 are on motherboard 102, a reset of one of the planes needs to come up to a known state such that un-reset plane can communicate with the next plane.

Reset logic 114 controls the resetting of the control plane 110 and data pane 112. In one embodiment, reset logic 114 sends two types of reset signals: control and not data plane reset 122 to control plane 110 and control and data plane reset 124 to control plane 110 and data plane 112. In alternate embodiments, reset logic 114 can send equivalent reset signals that allow reset logic to reset control 110 and data planes 112 independently, and/or in groups. Because reset logic 114 can send two types of reset signals that reset different parts of motherboard 102, motherboard 102 comprises two reset domains. In the embodiment illustrated in FIG. 1, the two reset domains are: (i) the control plane reset domain comprising control plane 110 and cross plane boundary logic 116 and (ii) control and data plane reset domain comprising cross plane boundary logic 116, control plane 110, and data plane 112. In alternative embodiments, different types of reset domains can be defined depending on the types of reset signals generated and sent.

On the other hand, in the control and data plane reset domain, control plane 110, data plane 112 and cross plane boundary logic 116 are reset by control and data plane reset 124. All of cross plane boundary logic 116 is reset in this case, meaning control domain reset logic 118 and data domain reset logic 120 are activated in this reset domain. Resetting these entities allows control plane 110 and data plane 112 to come up together and alleviating the need to coordinate the newly reset states of the two planes.

In the control plane reset domain, the control plane 110 and part of the cross plane boundary logic 116 is reset by control and not data plane reset 122. Cross plane boundary logic 116 comprises control domain reset logic 118 and data domain reset logic 120. When cross plane boundary logic 116 receives a control and not data plane reset 122, cross plane boundary logic 116 activates control domain reset logic 118 to reset the parts of cross plane boundary logic 116 that are associated with the control plane. Thus, not all of cross plane boundary logic 116 is reset upon receiving a control and not data plane reset 122. Because cross plane boundary logic 116 is partially reset, the functions of data 112 continue while control plane 110 resets.

While the embodiment described the invention in terms of one control plane, alternate embodiments of the invention may have more than one control plane. In these embodiments, all of the control planes may be reset from a control plane and not data plane reset. Even though there are multiple control planes, this is not a failover of control planes, because all of the control planes are being reset while the data plane continues forwarding data traffic. Alternatively, one, some or all of the multiple control planes may participate in a control plane failover as well as participate in a non-failover reset control plane reset while the data plane continues to forward data traffic.

After control plane 110 is reset, control plane 110 may bring up its operations, services, etc., by rebuilding forwarding tables, data sets, etc. and reassert control over data plane 112. Alternatively, control plane 110 may recover its operational capacity by retrieving operating data from a previous saved checkpoint. Furthermore, control plane 110 furthers resets by synching services with data plane 112 and/or outside services which the network element may participate in.

Figure 7:
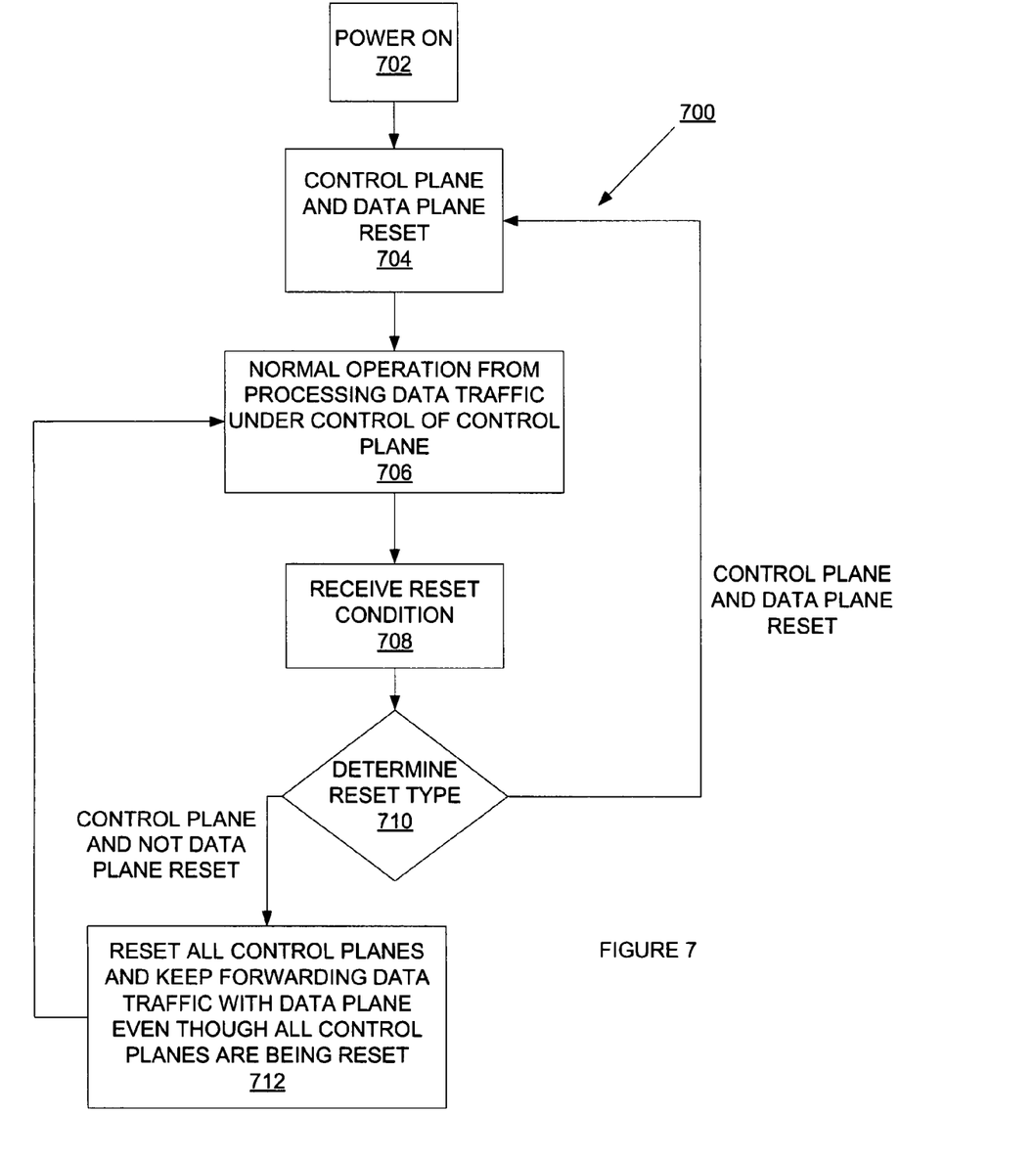

FIG. 7 is an exemplary flow diagram for processing reset conditions ("method 700") according to one embodiment of the invention. In FIG. 7, at block 702, method 700 receives the power on reset condition. At block 704, method 700 resets control plane 110 and data plane 112.

At block 704, method 700 processes data traffic under normal operation of network element 100 because the processing of the data traffic is under control of the control plane. Method 700 receives a reset condition at block 708. For example and by way of illustration, a reset condition maybe power on, hardware reset button activated, software watchdog timer activated, operating system upgrade, software crash, etc. At block 710, method 700 determines the type of the reset condition. If the reset type is a control plane and data plane reset, execution proceeds to block 704, where, at block 704, method 700 resets the control plane 110 and data plane 112. However, if the reset type is control plane and not data plane, method 700 resets all the control planes and keep forwarding data traffic with data plane 112, even though all control planes are being reset at block 712. Because all the control planes are being reset, none of the control planes are participating in a failover. Execution proceeds to block 706.

Figure 2:
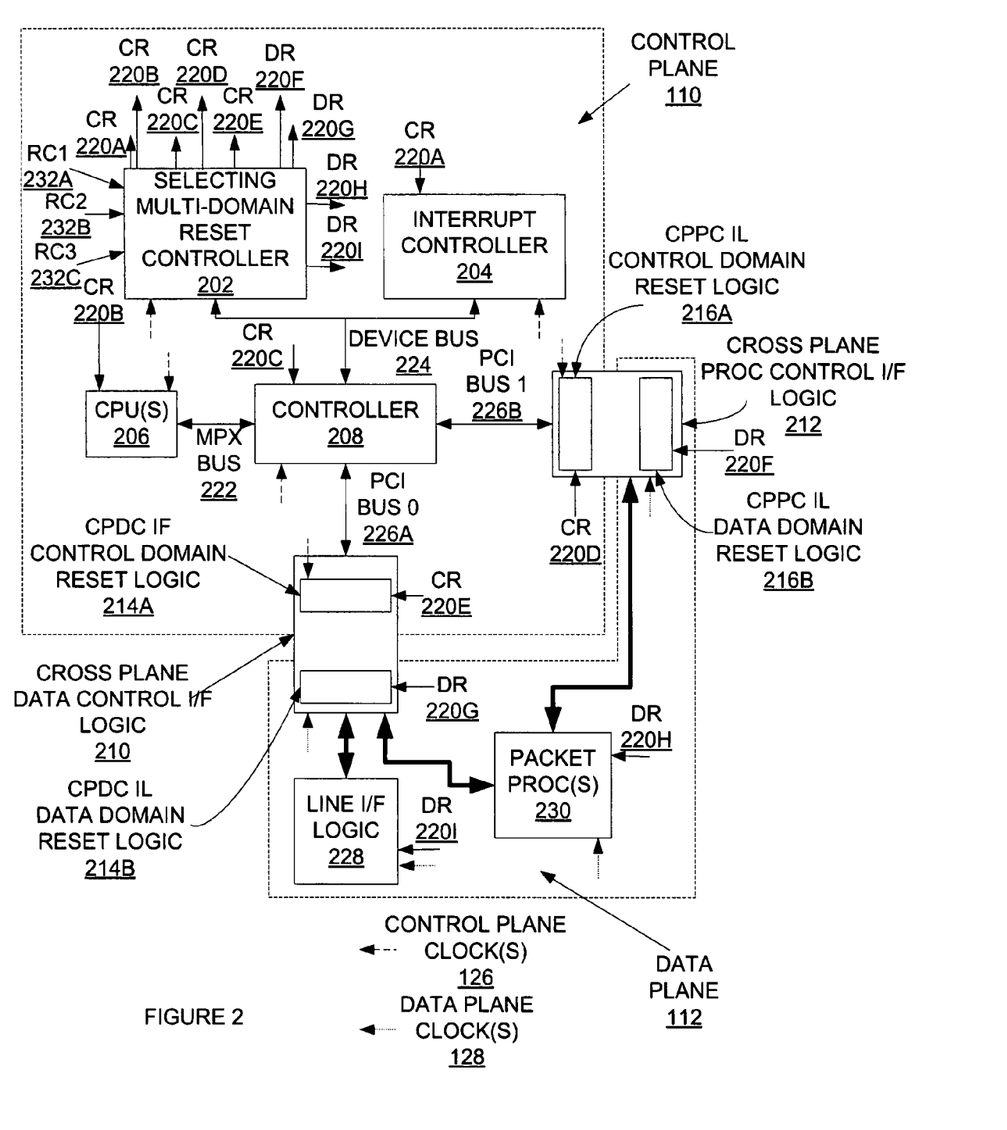
FIG. 2 illustrates the reset domains for the control and data planes of the network element according to one embodiment of the invention.

FIG. 2 illustrates the clock and reset domains for the control and data planes of the network element according to one embodiment of the invention. In FIG. 2, control plane 110 comprises selecting multi-domain reset controller 202, interrupt controller 204, central processing unit(s) (CPU(s)) 206, and controller 208. Selecting multi-domain reset controller 202, interrupt controller 204, and controller 208 are coupled by device bus 224. CPU(s) 206 and controller 208 are coupled by MPX bus 222. Control plane 110 couples with data plane 112 through cross plane data control interface logic 210 and cross plane processor control interface logic 212. Furthermore, cross plane data control interface logic 210 couples with controller 208 though PCI bus 0 226A, whereas cross plane processor control interface logic 212 couples with controller 208 though PCI bus 1 226B.

In FIG. 2, cross plane boundary logic 116 comprises cross plane data control interface logic 210 and cross plane processor control interface logic 212. Similar to cross plane boundary logic 116, logics 210-212 comprise control and data domain reset logic. For example and by way of illustration, cross plane data control interface logic 210 comprises cross plane data control interface logic (CPDCIL) control domain reset logic 214A and CPDCIL data domain reset logic 214B. Likewise, cross plane processor control interface logic 210 comprises cross plane processor control interface logic (CPPCIL) control domain reset logic 216A and CPPCIL processor domain reset logic 216B.

Data plane 112 further comprises line interface logic 228 and packet processor(s) 230.

FIG. 2 further illustrates reset signals 220A-I generated by selecting multi-domain reset controller 202 based on reset conditions 232A-C. As above, reset conditions 232A-C may be, but not limited to, power on, hardware reset button activated, software watchdog timer activated, operating system upgrade, etc. While in one embodiment there are four reset conditions, in alternate embodiments, there are more or less reset conditions. Reset signals 220A-I are in two groups, reset signals 220A-E sent to components associated with control plane 110 and reset signals 220F-I sent to components associated with data plane 112. For example and by way of illustration, control plane reset signals 220A-E are sent to interrupt controller 204, CPU(s) 206, controller 208, CPPCIL control domain reset logic 216A, and CPDCIL control domain reset logic 214A, respectively. In one embodiment, control plane reset signals 220A-E are sent when selecting multi-domain reset controller 202 generates a reset for the control plane 110 and/or the control plane 110 and data plane 112. Thus, in one embodiment, control plane and not data plane reset 122 comprise reset signals 220A-E.

Reset signals 220F-I are used to reset the data plane. For example and by way of illustration, data plane reset signals 220F-I are sent to CPPCIL data domain reset logic 216B, packet processor(s) 230, CPDCIL data domain reset logic 214B, and line interface logic 228. In one embodiment, data plane reset signals 220F-I are sent when selecting multi-domain reset controller 202 generates a reset for the data plane 112 and/or control plane 110 and data plane 112.

In one embodiment, control plane resets 220D-E reset CPPCIL control domain reset logic 216A and CPDCIL control domain reset logic 214A, respectively, in part, by resetting the PCI bus associated with reset logics 214A, 216A. By resetting parts of logics 210, 212, data plane 112 is not affected by the control plane resets and allows data plane 112 to continue processing data traffic while control plane 110 resets.

Using resets signals 220A-I, both control plane 110 and data plane 112 reset. Thus, in one embodiment, control plane and not data plane reset 124 comprise reset signals 220A-E.

Each component in control 110 and data planes 112 receives one or more clocks. For example and by way of illustration, selecting multi-domain reset controller 202, interrupt controller 204, CPU(s) 206, controller 208 receive control plane clock(s) 126. Furthermore, line interface logic and packet processor(s) 230 receive data plane clock(s) 128. In addition, cross plane data control interface logic 210 and cross plane protocol control interface logic 212 receive both types of clock(s), with control plane clock(s) 126 going to CPPCIL control domain reset logic 216A and CPDCIL control domain reset logic 214A with data plane clock(s) going to CPPCIL data domain reset logic 216B and CPDCIL data domain reset logic 214B. Interface logics 210-212 receive both clock types because logics 210-212 operate in both reset domain and need to synchronize with both control 126 and data plane 128 clock(s).

Figure 3:
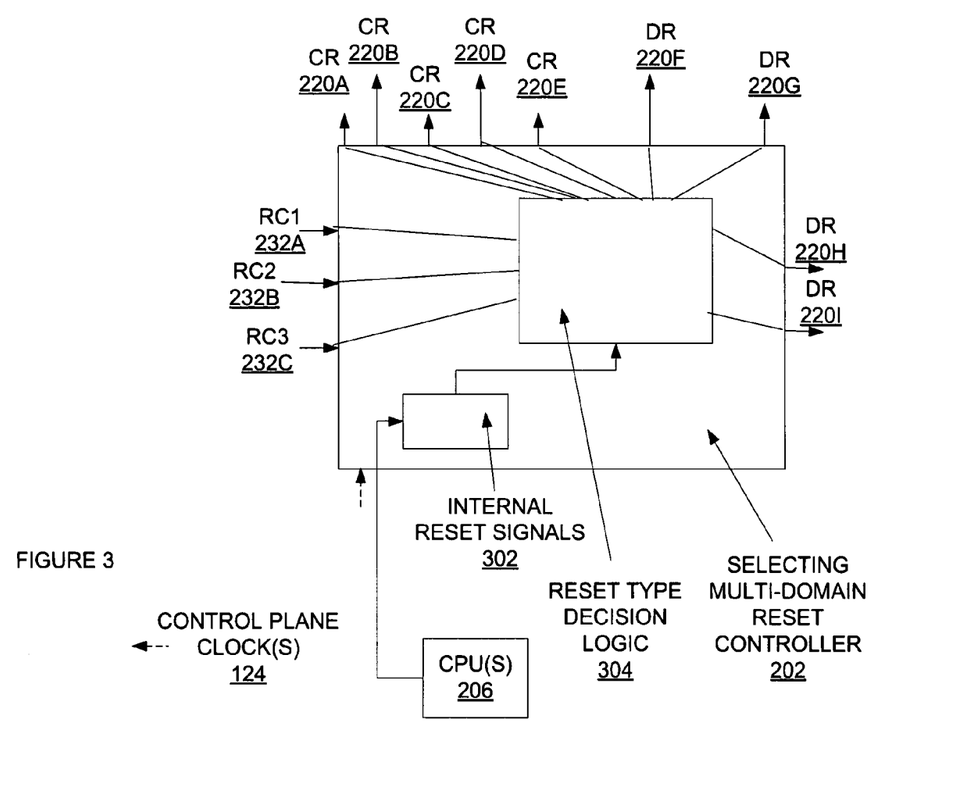
FIG. 3 illustrates the selecting multi-domain reset controller according to one embodiment of the invention.

FIG. 3 illustrates the selecting multi-domain reset controller according to one embodiment of the invention. In FIG. 3, selecting multi-domain reset controller 202 comprises internal reset signals 302 and reset type decision logic 304. CPU(s) 206 may add information to internal reset signals 302. In addition, selecting multi-domain reset controller 202 receives control plane clock(s) 124.

Input to selecting multi-domain reset controller 202 are reset conditions 232A-C. Output from selecting multi-domain reset controller 202 are reset signals 202A-I. Reset type decision logic 304 receives reset conditions 232A-C and internal reset signals 304 to generate reset signals 220A-I. While in one embodiment, selecting multi-domain reset controller 202 generates reset signals 220A-I that result in reset actions according to table 1, in alternate embodiments, controller 202 generates the same and/or different reset signals that may lead to the same, less, more, and/or different reset actions. Furthermore alternate embodiments may include additional device affects by the same and/or different reset conditions.

| Device | Power On | System Hard Reset via SW | Watchdog | Control Plane via SW |
|---|---|---|---|---|
| Controller 208 | System 222, 224 and PCI 226A-B busses | System 222, 224 and PCI 226A-B busses | System 222, 224 and PCI 226A-B busses | System 222, 224 and PCI 226A-B busses |
| Interrupt Controller 204 | Clock Manager and Interrupt Controller 204 | Clock Manager and Interrupt Controller 204 | Interrupt Controller 204 | Interrupt Controller 204 |
| Cross plane Data Control Interface Logic 210 | Clock Manager, PCI Bus 2226A-B, Logic 210 | Clock Manager, PCI Bus 226A-B, Logic 210 | PCI Bus 226A-B | PCI Bus 226A-B |
| Cross plane Protocol Control Interface Logic 212 | Clock Manager, PCI Bus 226A-B, Logic 212 | Clock Manager, PCI Bus 226A-B, Logic 212 | PCI Bus 226A-B | PCI Bus 226A-B |

Table 1. Reset actions to devices based on reset conditions.

Table 1 lists the reset condition and the corresponding action that happens to a device. The action is triggered by the associated reset signal generated by selecting multi-domain reset controller 202. For example and by way of illustration, in a power on reset condition, selecting multi-domain reset controller 202 generates a control and data plane reset 124, comprising control reset signals 220A-E and data reset signals 220F-I. Controller 208 receives reset control signal 220C and resets PCI busses 226A-B associated with controller 208, as well as MPX 222 and device 224 busses. In addition, interrupt controller 204 receives control reset signal 220A and resets itself 204 and the clock manager associated with interrupt controller 204. CPU(s) 206 receive control reset signal 220B and resets itself 206 and the clock associated with CPU(s). Cross plane data control interface logic 210 receives control reset signal 220D and resets CPDCIL control plane logic 214A, PCI bus 226A, and the clock associated with logic 210. Cross plane processor control interface logic 212 receives control plane reset signal 220D and resets CPPCIL control plane logic 216A, PCI bus 226A, and the clock associated with logic 212.

Cross plane processor control interface logic 212 receives data reset signal 220F and resets CPPCIL data domain logic 216B. Cross place data control interface logic 210 receives data reset signal 220G and resets CPDCIL control data domain reset logic 214B. Packet processor(s) 230 receive data reset signal 220H and packet processor(s) reset themselves. Line interface logic 228 receives data reset control signal 220I, and resets itself. Thus, a power on reset condition causes the control and data plane to be reset.

A system hard reset via software reset condition causes a control and data plane reset 124 as well. As with a power on reset condition, selecting multi-domain reset controller 202 receiving a system hard reset via software reset condition generates control reset signals 220A-E and data reset signals 220F-I. While in one embodiment, the control reset 220A-E and data 220F-I reset signals causes the same resetting of the hardware as described above with the power on reset condition, in alternate embodiments, the reset conditions can cause the resetting of the same, additional, or less hardware.

In contrast, in one embodiment, a watchdog reset condition results in resetting of the control plane. In this embodiment, by receiving a watchdog reset condition, selecting multi-domain reset controller 202 generates a control and not data reset 122, comprising control reset signals 220A-E. Similar to above, control reset signals 220A-E cause the resetting of interrupt controller 204, CPU(s) 206, controller 208, CPPCIL control domain reset logic 216A, and CPDCIL control domain reset logic 214A, respectively. By receiving a watchdog reset condition, selecting multi-domain reset controller 202 does not generate data reset signals. Thus, hardware components of data plane 112 are not reset and continue to function. This gives an illustration of an action resulting from a control plane reset (watchdog reset condition) and a control and data plane reset (power on).

In one embodiment, similar to the watchdog reset condition, a control plane reset via software reset condition causes selecting multi-domain controller 202 to generate a control and not data plane reset 122, comprising control plane reset signals 220A-E. In this embodiment, control reset signals 220A-E causes the resetting of interrupt controller 204, CPU(s) 206, controller 208, CPPCIL control domain reset logic 216A, and CPDCIL control domain reset logic 214A, respectively.

Figure 4:
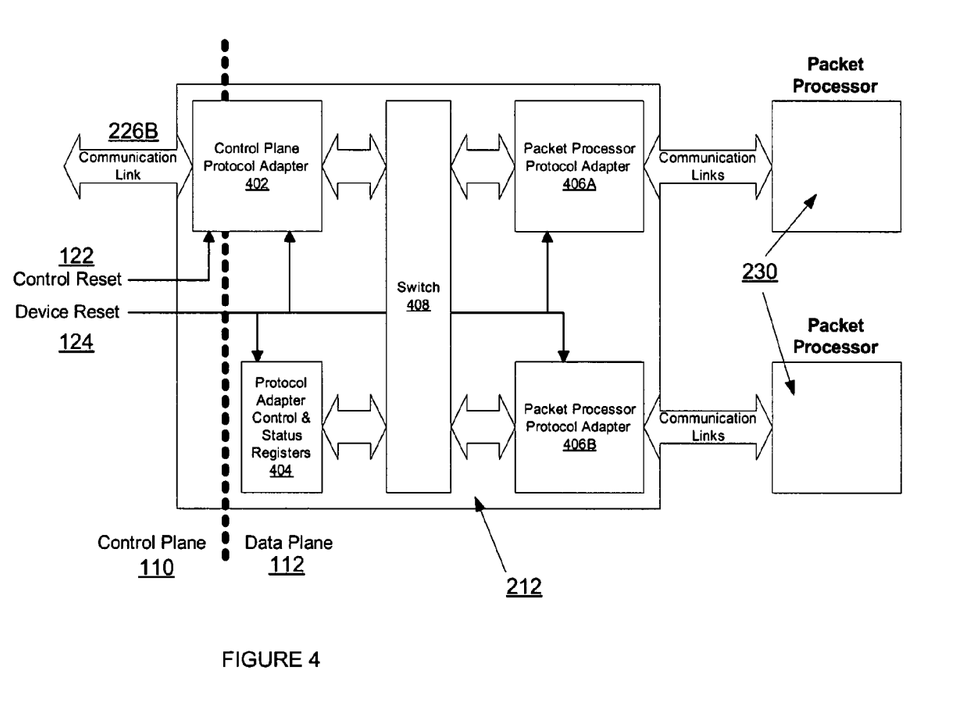
FIG. 4 illustrates the cross plane processor control interface logic according to one embodiment of the invention.

FIG. 4 illustrates the cross plane processor control interface logic 212 according to one embodiment of the invention. In FIG. 4, cross plane processor control interface logic 212 comprises control plane protocol adapter 402, packet processor protocol adapter 406A-B, and protocol adapter control and status registers 404 coupled to switch 408. Furthermore, cross plane processor control interface logic 212 comprises control plane protocol adapter 402 is coupled to control plane 110 via PCI bus 226B and packet processor protocol adapter 406A-B are coupled to packet processor(s) 230.

FIG. 4 further illustrates which types of resets are applied to which component of cross plane processor control interface logic 212. For example and by way of illustration, control plane and not data plane reset 122 is applied to control plane protocol adapter 402. In contrast, control and data plane reset 124 is applied to control plane protocol adapter 402, packet processor protocol adapter 406A-B, and protocol adapter control and status registers 404. Thus, based on the types of resets applied to the components of cross plane processor control interface logic 212, control plane protocol adapter 402 is associated with control plane 110, whereas packet processor protocol adapter 406A-B and protocol adapter control and status registers 404 are associated with data plane 112. Therefore, a control plane and not data plane reset 122 resets control plane protocol adapter 402 allowing the other components to continue communicating with each other, while keeping any initializations that occurred in the protocol adapter control and status registers 404. A control and data plane reset 124 resets control plane protocol adapter 402, packet processor protocol adapter 406A-B, and protocol adapter control and status registers 404, putting cross plane processor control interface logic 212 into a known state.

Figure 5:
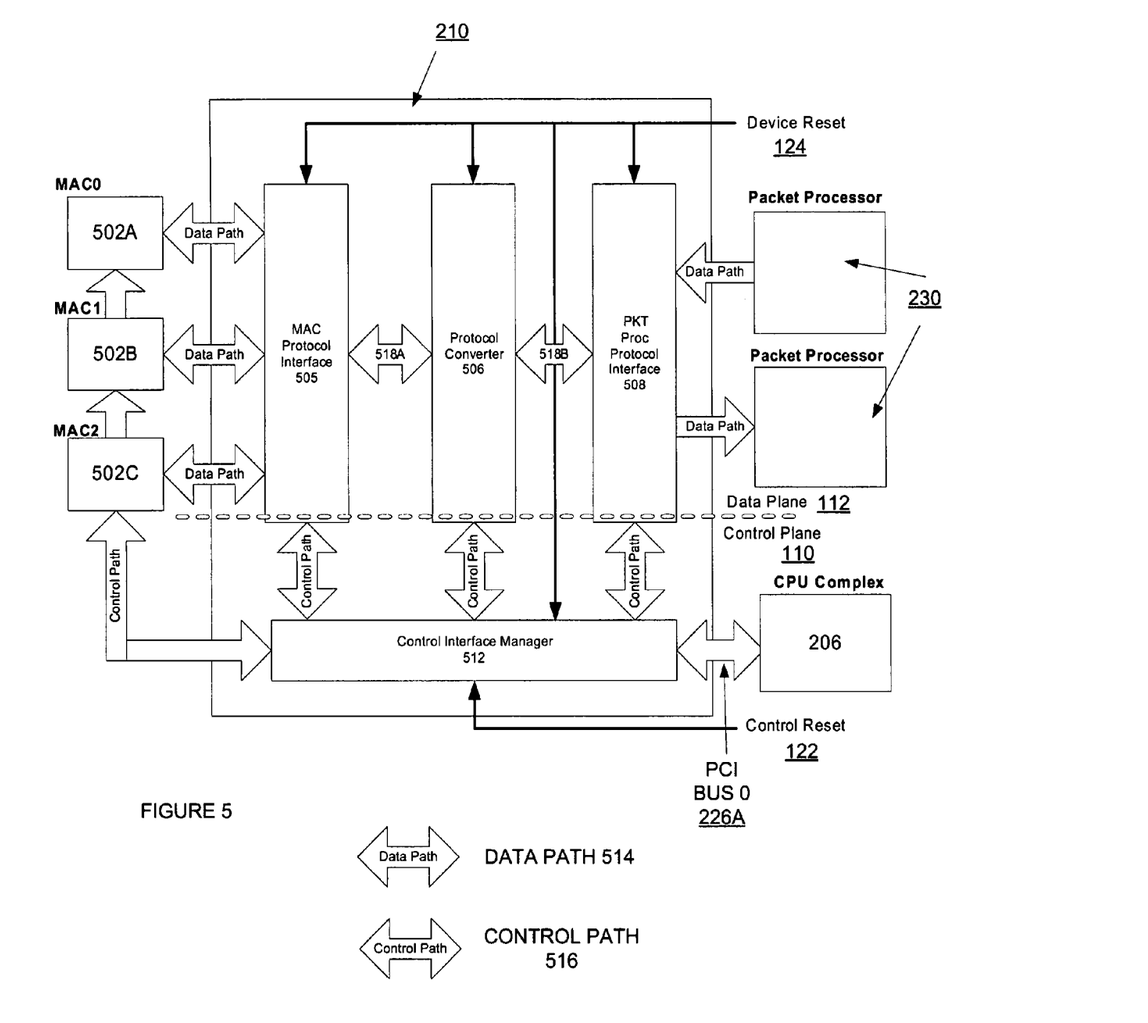
FIG. 5 illustrates the cross plane data control interface logic according to one embodiment of the invention.

FIG. 5 illustrates the cross plane data control interface logic 210 according to one embodiment of the invention. In FIG. 5, cross plane data control interface logic 210 comprises Media Access Controls (MACs) 502A coupled to MAC protocol interface 505 via data path 514. MAC protocol interface 505 is coupled to protocol converter 506 via internal connection 518A, and protocol converter 506 is coupled to packet processor protocol interface 508 via internal connection 518B. Packet processor protocol interface 508 couples to packet processor(s) 230 via data path 516. In addition, control interface manager 512 couples to MAC protocol interface 505, protocol converter 506, and packet processor protocol interface 508 via control path 516. Control interface manager 512 further couple to CPU(s) 206 via PCI bus 226A.

FIG. 5 further illustrates which types of resets are applied to which component of cross plane data control interface logic 210. For example and by way of illustration, control plane and not data plane reset 122 can be applied to control interface manager 512. In contrast, control and data plane reset 124 is applied to control interface manager 512, MAC protocol interface 505, protocol converter 506, and packet processor protocol interface 508. Thus, based on the types of resets applied to the components of cross plane data control interface logic 210, control interface manager 512 is associated with control plane 110, whereas MAC protocol interface 505, protocol converter 506, and packet processor protocol interface 508 are associated with data plane 112. Therefore, a control plane and not data plane reset 122 resets control interface manager 512, allowing the other components of logic 210 to continue functioning. This allows packet processor(s) 230 and MACs 502A-C to continue to forward traffic while control plane 110 resets. A control and data plane reset 124 resets control interface manager 512, MAC protocol interface 505, protocol converter 506, and packet processor protocol interface 508, putting cross plane data control interface logic 210 into a known state.

Figure 6:
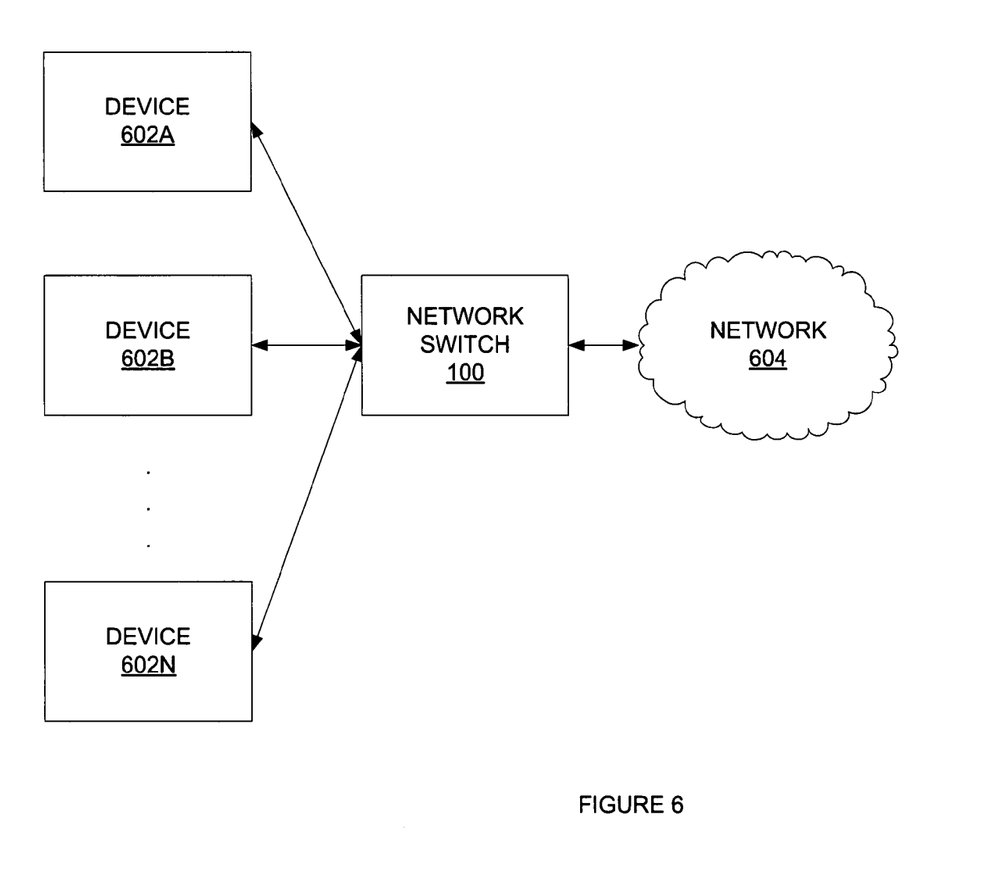
FIG. 6 illustrates the network element switching data traffic between a plurality of devices and a data network illustrates the cross plane processor control interface logic according to one embodiment of the invention.

FIG. 6 illustrates the network element switching data traffic between a plurality of devices and a data network illustrates the cross plane processor control interface logic according to one embodiment of the invention. In FIG. 6, devices 602A-N couple to network switch 100, and network switch 100 couples to network 600. While in one embodiment, devices 602A-N is a computer, in an alternate embodiment, devices 602A-N is a different type of device capable of transmitting and receiving data traffic (router, switch, set top box, hub, laptop, cell phone, personal handheld device, modem, etc.). Network switch receives and transmits data traffic to and from devices 602A-N and network 600. In one embodiment, network switch 100 is in a place relative to network 600 and devices 602A-N where network switch to be a high-availability switch.

A network device that forwards customer traffic while the control plane is reset has been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A network element comprising:
   a line card configured to receive and transmit data traffic; and
   a motherboard coupled to the line card, the motherboard including:

one or more control planes configured to control data traffic processing of the network element;
a data plane configured to perform the data traffic processing; and
a selecting multi-domain reset controller configured to selectively reset the one or more control planes without resetting the data plane, wherein to selectively reset the one or more control planes comprises resetting the one or more control planes while the data traffic processing by the data plane continues and without interruption while the one or more control planes are reset and returning the one or more control planes to a state able to reassert control over the data plane.

2. The network element of claim 1, wherein the selecting multi-domain reset controller is configured to transmit one or more control plane reset signals to a set of control plane components of the one or more control planes, and wherein each of the one or more control plane reset signals indicates that one of the set of control plane components is to be reset.

3. The network element of claim 1, further comprising:
cross plane processor control logic coupled to the data plane and at least one of the one or more control planes, comprising cross plane processor control interface control domain reset logic and cross plane processor control interface data domain reset logic, configured to selectively reset the cross plane processor control interface control domain reset logic in response to a control plane reset signal.

4. The network element of claim 1, the motherboard further comprising:
cross plane data control logic coupled to the data plane and at least one of the one or more control planes, comprising cross plane data control interface control domain reset logic and cross plane data control interface data domain reset logic, configured to selectively reset the cross plane data control interface control domain reset logic in response to a control plane reset signal.

5. The network element of claim 1, wherein the selecting multi-domain reset controller further comprises reset type decision logic configured to output one or more control plane reset signals in response to receiving a reset condition.

6. The network element of claim 5, wherein the reset condition is one of an external reset condition and an internal reset condition.

7. The network element of claim 6, wherein the external reset condition is one of power on, system hard reset via software, watchdog, and control plane reset via software.

8. The network element of claim 1, wherein the data plane further comprises a packet processor.

9. The network element of claim 1, wherein the one or more control planes further comprise a central processing unit.

10. A method performed by a network element, comprising:
receiving a control plane reset condition, wherein the control plane reset condition indicates that one or more control planes of the network element are to be reset, and wherein the network element comprises a motherboard and a line card, the motherboard including the one or more control planes and a data plane and the one or more control planes comprise a set of control plane components;
generating a set of control plane signals;
resetting respective control plane components from the set of control plane components in response to the generated set of control plane signals while data traffic processing by the data plane continues and without interruption over a period when the respective control plane components are reset; and
returning the one or more control planes to a state able to reassert control over the data plane.

11. The method of claim 10, further comprising:
transmitting the set of control plane signals to the respective control plane components.

12. The method of claim 10, further comprising:
selectively resetting a control plane component responsible for cross plane processor control.

13. The method of claim 10, further comprising:
selectively resetting a control plane component responsible for cross plane data control.

14. The method of claim 10, wherein the reset condition is one of an external reset condition and an internal reset condition.

15. A machine-readable storage medium that is one of a disk, a memory, and a card and that stores instructions, which when executed by one or more processors, cause said one or more processors to perform operations comprising:
receiving a control plane reset condition, wherein the control plane reset condition indicates that one or more control planes of a network element are to be reset, wherein the network element comprises a motherboard and a line card, the motherboard including the one or more control planes and a data plane and the one or more control planes comprise a set of control plane components;
generating a set of control plane signals;
resetting respective control plane components from the set of control plane components in response to the generated set of control plane signals without an interruption of data traffic processing by the data plane; and
returning the one or more control planes to a state able to reassert control over the data plane.

16. The machine-readable storage medium of claim 15, further comprising:
transmitting the set of control plane signals to the respective control plane components.

17. The machine-readable storage medium of claim 15, further comprising:
selectively resetting a control plane component responsible for cross plane processor control.

18. The machine-readable storage medium of claim 15, further comprising:
selectively resetting a control plane component responsible for cross plane data control.

19. An apparatus comprising:
a motherboard;
a data plane module including a component on the motherboard and operable to process data traffic;
a control plane module on the motherboard and operable to control the data traffic processing comprising,
a selecting multi-domain reset control module that selectively resets the control plane module without resetting the data plane module, wherein to selectively reset the control plane module comprises resetting the control plane module without an interruption of the data traffic processing by the data plane module and returning the control plane module to a state able to reassert control over the data plane module; and
a cross plane interface module comprising a control plane interface and a data plane interface, wherein the cross plane interface module selectively resets the control plane interface in response to the control plane module resetting.

20. The apparatus of claim 19, wherein the selecting multi-domain reset control module transmits one or more control plane reset signals to a set of control plane components of the control plane module, wherein each of the one or more control plane reset signals indicates that one of the set of control plane components is to be reset.

21. The network element of claim 1, wherein the motherboard is a main board to control a flow of data in the network element.

22. The network element of claim 21, wherein the motherboard is coupled to a plurality of line cards.

23. The method of claim 10, wherein the motherboard is a main board to control a flow of data in the network element, and wherein the motherboard is coupled to a plurality of line cards.

* * * * *

UNITED STATES PATENT AND TRADEMARK OFFICE
CERTIFICATE OF CORRECTION

PATENT NO. : 8,554,949 B2
APPLICATION NO. : 11/725084
DATED : October 8, 2013
INVENTOR(S) : Goodill et al.

Page 1 of 1

It is certified that error appears in the above-identified patent and that said Letters Patent is hereby corrected as shown below:

On the title page, in item (56), under "OTHER PUBLICATIONS", in Column 2, Line 5, delete "Suppernentary" and insert -- Supplementary --, therefor.

In the Specification

In Column 6, Line 53, delete "control plane clock(s) 124." and insert -- control plane clock(s) 126. --, therefor.

Signed and Sealed this
Fifteenth Day of April, 2014

Michelle K. Lee
*Deputy Director of the United States Patent and Trademark Office*